US007493748B2

(12) United States Patent
Sarashi

(10) Patent No.: US 7,493,748 B2
(45) Date of Patent: Feb. 24, 2009

(54) PNEUMATIC TIRE WITH METAL CORD AND METHOD OF MANUFACTURING METAL CORD

(75) Inventor: Hiroki Sarashi, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 447 days.

(21) Appl. No.: 11/199,153

(22) Filed: Aug. 9, 2005

(65) Prior Publication Data

US 2006/0065341 A1 Mar. 30, 2006

(30) Foreign Application Priority Data

Aug. 30, 2004 (JP) ............................ 2004-250559

(51) Int. Cl.
*D07B 1/00* (2006.01)

(52) U.S. Cl. ........................................................ 57/311

(58) Field of Classification Search .................. 57/311; 152/451

See application file for complete search history.

(56) References Cited

U.S. PATENT DOCUMENTS 5,135,039 A 8/1992 Mizuta et al.
6,698,179 B2 * 3/2004 Noferi ......................... 57/311
6,805,178 B2 * 10/2004 Miyazaki et al. ............ 152/556
2002/0038539 A1 4/2002 Miyazaki et al.
2003/0116248 A1 * 6/2003 Miyazaki et al. ............ 152/451
2004/0060632 A1 4/2004 Miyazaki et al.

FOREIGN PATENT DOCUMENTS

EP 0 752 325 A1 1/1997

* cited by examiner

*Primary Examiner*—Shaun R Hurley
(74) *Attorney, Agent, or Firm*—Birch, Stewart, Kolasch & Birch, LLP

(57) ABSTRACT

A pneumatic tire includes metal cords each made of metal filaments twisted together, the metal cords having an initial elongation in a range of from 0.05 to 0.20% and a standard deviation of the initial elongation in a range of not more than 0.02. A method of manufacturing the metal cord comprises shaping metal filaments in a two-dimensional zigzag waveform, and twisting the shaped metal filaments together, wherein the number of the filaments is in a range of from 8 to 12, the metal filaments have the same diameter (d) of from 0.15 to 0.30 mm, the shaped metal filaments have the same zigzag waveforms, the zigzag waveform of each said shaped metal filament has constant wave lengths (P) and constant wave heights (h) wherein the ratio (P/d) is in the range of 100/3 to 700/3, and the ratio (h/d) is in the range of 5/3 to 80/3.

9 Claims, 5 Drawing Sheets

6
6a
6c
6a
d
h
Q
Q
P
6b
II
6b
6
6b
6a
6b
6a

PNEUMATIC TIRE WITH METAL CORD AND METHOD OF MANUFACTURING METAL CORD

BACKGROUND OF THE INVENTION

1. Field of the Invention

The present invention relates to a pneumatic tire, more particularly to a metal cord having a specific initial elongation being capable of improving the tire durability.

2. Description of the Background Art

In the pneumatic tires, steel cords are widely used as tension members to reinforce various tire components, for examples, a carcass in a heavy duty tire, a tread reinforcing belt, a bead reinforcing layer and the like.

In the case of the carcass of the truck/bus tires for example, "1×n×d" cord structures and layered cord structures "2×d+6×d", "3×d+8×d", "3×d+9×d" and "3×d+9 ×d+1×d" are usually used in the ply. AS well known in the tire cord art and as described in the Japanese Industrial standard G3510 "Testing methods for steel tire cords", the "1×n×d" cord structure indicates that a number (n) of steel filaments having a diameter (d) are, as one bunch, twisted together into a cord. A layered cord structure has a core, a sheath and optionally a wrapping wire. For example, "3×d+9×d" indicates that a core is made up of three steel filaments having a diameter (d) and an outer sheath is made up of nine steel filaments having the diameter (d). "3×d+9×d+1×d" indicates that a steel filament having the diameter (d) is wound around the "3×d+9×d" structure as an additional wrapping wire.

In recent years, on the other hand, in order to improve the penetration of the topping rubber into such cord structures, the use of waved filaments has been proposed.

When the waved filaments are twisted, gaps are formed between the filaments, and the penetration of topping rubber into the cord is facilitated.

Getting another perspective on the formation of the gaps, as the filaments are not firmly contact each other, when the contacting condition is varied, cord characteristics, e.g. elongation, tensile modulus and the like are also varied. This is especially remarkable when the cord load is light.

When a cord just manufactured is measured, the variations of the cord characteristics are probably small as the cord is long and a suitable tension is applied thereto. But, when the cords are cut into a certain length are laid parallel with each other in a form of rubberized ply or layer, the variations are increased.

Therefore, when the cords are used to reinforce the carcass of the heavy duty radial tires, as the carcass cord tension is very large in comparison with the other usages such as tread reinforcing belt and bead reinforcing layer, the variations of the cord characteristics have an adverse affect on tire performance.

More or less, the carcass cords embedded in the tire grow or their lengths increase during use. In particular, when the initial elongation of the cord is larger, the cord becomes longer. Thus, if the variation of the initial elongations of the cords is large, the tire uniformity is deteriorated. Further, due to the different cord lengths, the load concentrates on the shorter cords. Thus, the shorter cords are liable to fatigue more than the longer cords, and the durability is decreased.

SUMMARY OF THE INVENTION

A primary object of the present invention is therefore, to provide a pneumatic tire of which durability is improved by specifically limiting the initial elongations of the cords to control the variation of the cord characteristics.

Another object of the present invention is to provide a method of manufacturing a metal cord by which the variation of cord growth during use can be decreased to improve the durability.

According to one aspect of the present invention, a pneumatic tire includes a rubber component reinforced with metal cords each made of metal filaments twisted together, the metal cords having an initial elongation in a range of from 0.05 to 0.20%, and a standard deviation of the initial elongation in a range of not more than 0.02, wherein the initial elongation of each cord is a difference of an elongation in % of the cord at a load of 49N from an elongation in % of the cord at a load of 2.5N.

According to another aspect of the present invention, a method of manufacturing a metal cord having an initial elongation of from 0.05 to 0.20%, includes shaping metal filaments in a two-dimensional zigzag waveform, and twisting the shaped metal filaments together, wherein the number of the filaments is in a range of from 8 to 12, the metal filaments have the same diameter (d) of from 0.15 to 0.30 mm, the shaped metal filaments have the same zigzag waveforms, the zigzag waveform of each said shaped metal filament has constant wave lengths (P) and constant wave heights (h) wherein the ratio (P/d) is in the range of 100/3 to 700/3, and the ratio (h/d) is in the range of 5/3 to 80/3.

BRIEF DESCRIPTION OF THE DRAWINGS

Embodiments of the present invention will now be described in detail in conjunction with the accompanying drawings.

DETAILED DESCRIPTION OF THE INVENTION

According to the present invention, a metal cord 2 is made up of steel filaments 6 twisted together so that the initial elongation E becomes a predetermined constant value in a range of not more than 0.20% throughout the length.

Figure 1:
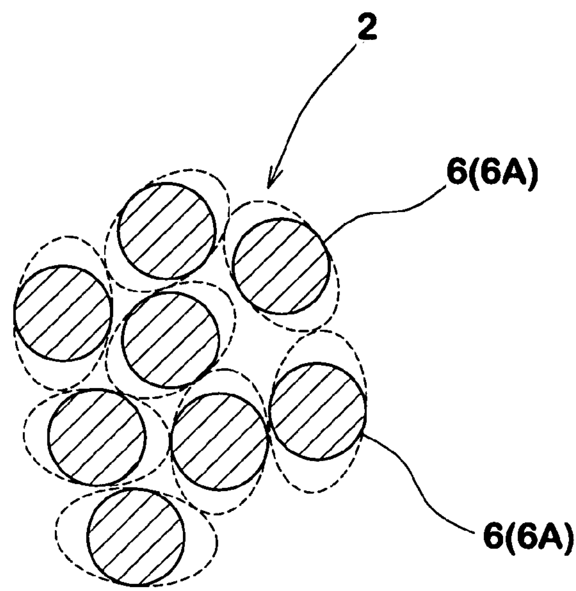
FIG. 1 is a schematic enlarged cross sectional view of a metal cord according to the present invention.
Figure 2:
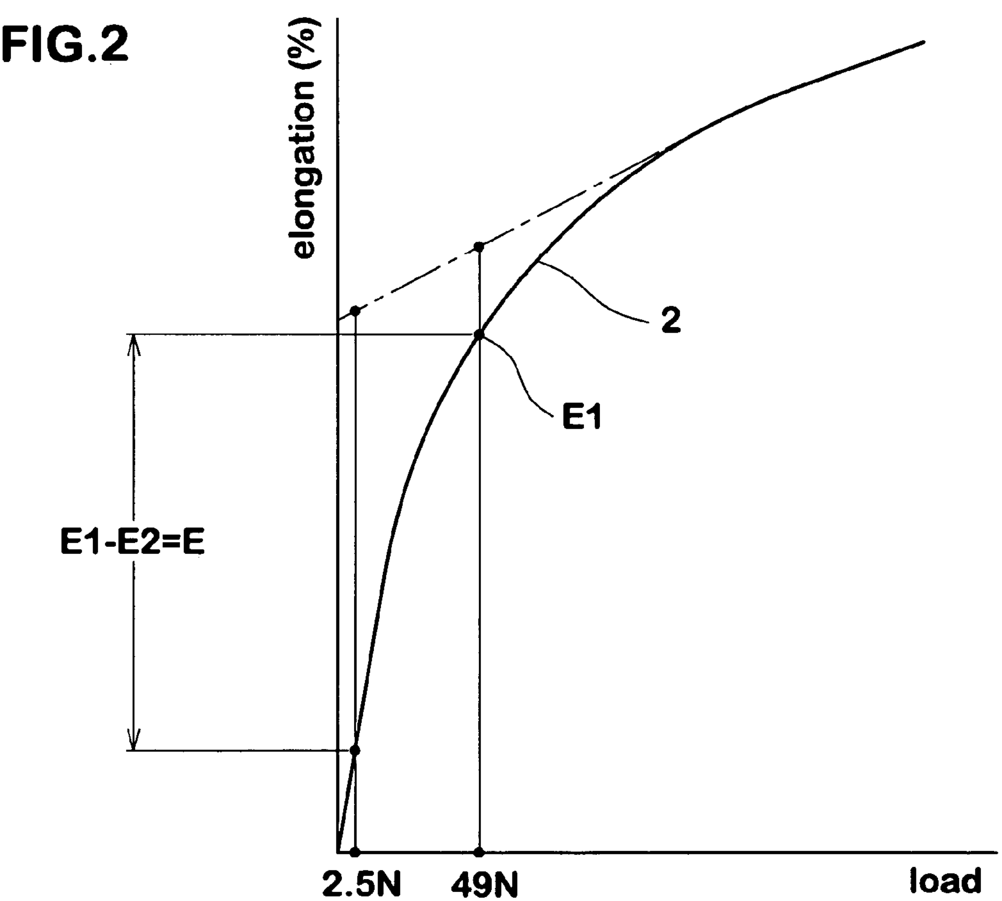
FIG. 2 shows a graph showing a load-elongation curve of a metal cord according to the present invention for explaining the initial elongation.

Here, the initial elongation E is, as shown in FIG. 2, defied as the difference (E1–E2) of E1 from E2, wherein E1 is the elongation in % of the cord at a load of 49N and E2 is the elongation in % of the cord at a load of 2.5N. The elongation E1, E2 is measured according to the Japanese Industrial Standard JIS-G3510 "Testing methods for steel tire cords", 6.4 "Force at break and Elongation at break".

In order that the initial elongation E maintains the constant value throughout the length of the cord, it is preferable that all the filaments 6 have the same diameter (d) of from 0.15 to 0.30 mm, and the number of the filaments 6 is in a range of from 8 to 12.

When the diameter (d) is less than 0.15 mm, even if the filament is shaped as explained later, the shape is very likely to be removed during twisting and the filament can not improve the penetration of rubber into the cord. Further, it is difficult for the cord to display a necessary strength especially in the case of the carcass ply of the heavy duty tires. On the other hand, if the diameter (d) is more than 0.30 mm, the flexibility of the cord required for the carcass ply will be lost and the fatigue resistance will be decreased.

In order to provide the metal cord 2 with the above-mentioned initial elongation E, the metal cord 2 is formed by twisting together a plurality of shaped filaments 6A only, namely, all the filaments 6 are shaped filaments 6A.

Figure 9:
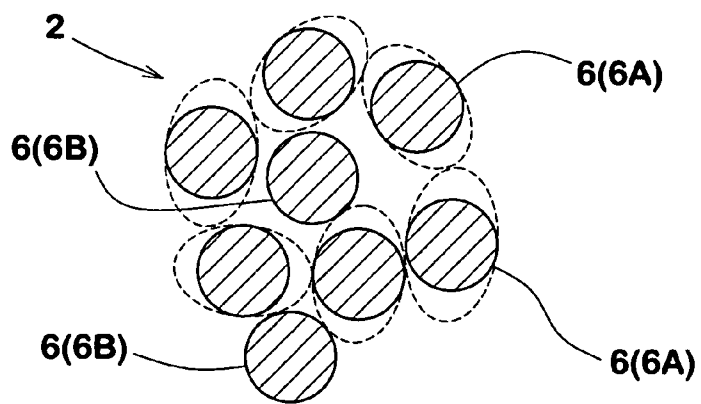
FIG. 9 is a schematic enlarged cross sectional view of a metal cord according to the present invention.

It may be possible to make the metal cord 2 with the shaped filaments 6A and non-shaped filaments 6B which are straight before twisted as shown in FIG. 9. But, in the case of the carcass ply of the heavy duty tires, as the cord load is very large, it is preferable that all the filaments are shaped filaments 6A, not to concentrate a large load on particular filaments.

Figure 3:
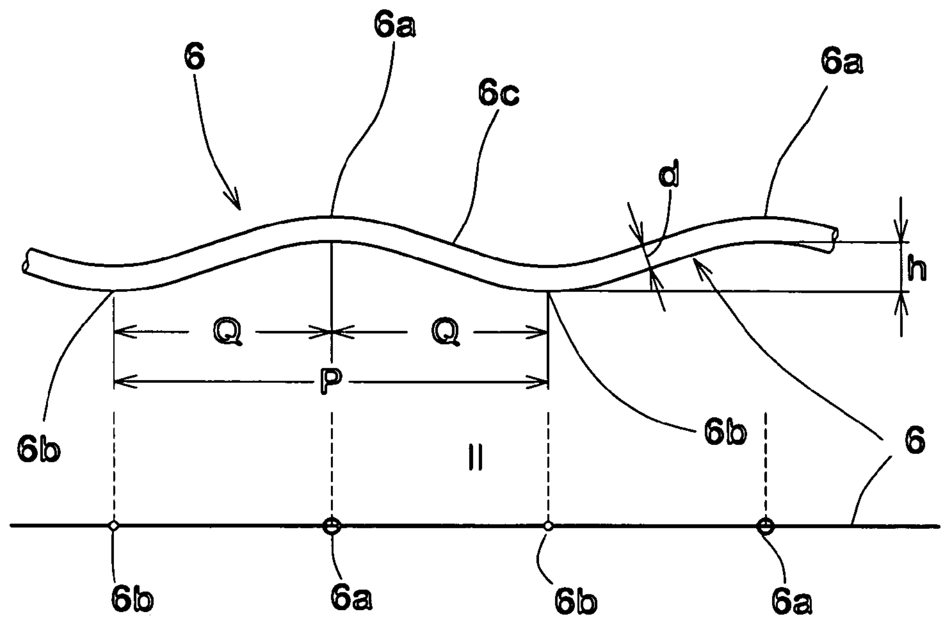
FIG. 3 shows a shaped filament included in the metal cord and an abbreviated indication of the shaped filament used in FIG. 4.

The shaped filaments 6A are, before twisted together, each 2-dimensionally waved such that, as shown in FIG. 3, straight segments 6*c* are formed between zigzag peaks 6*a* on one side and zigzag peaks 6*b* on the other side (hereinafter, the "troughs 6*b*"). Aside from this waveform including the straight segments, the filament may be 2-dimensionally waved in a curved waveform having no straight segment, e.g. sinusoidal waveform, a series of arcs and the like.

In the shaped filament 6A, it is preferable that the pitch lengths or wave lengths P and the wave heights h (excluding the diameter d as shown in FIG. 3) are constant throughout the entire length. And the ratio p/d of each wave length P to the filament diameter (d) is in the range of 100/3 to 700/3, and the ratio h/d of each wave height (h) to the filament diameter (d) is in the range of 5/3 to 80/3. If the ratio P/d is less than 100/3 and/or the ratio h/d is more than 80/3, then the cord strength is liable to decrease. If the ratio P/d is more then 700/3 and/or the ratio h/d is less than 5/3, then the rubber penetration becomes insufficient.

A half-wave lengths Q between the adjacent peak 6*a* and trough 6*b* are constant throughout the entire length. Thus, the waveforms are identical throughout the entire length.

In order to facilitate the initial elongation E being constant throughout the cord length, it is also important to improve the material homogeneity and geometrical uniformity of the filaments 6, 6A.

In general, a material wire for making the filament is produced by hot rolling of a wire rod, subsequent controlled cooling, first drawing, patenting treatment, second drawing, final patenting treatment, brass-plating, and final wet drawing. In such a case, it is preferable that the steel includes 0.01 to 0.2 weight % of Molybdenum in order to improve the homogeneity.

The shaped filament 6A is waved by passing a straight wire through between a pair of shaping dies being turning like a pair of gearwheels. Between the shaping dies, it is important that the entire length of the filament contacts with both the shaping dies. In other words, not to allow free-deformation of the filament, the shaping dies are provided therebetween with a gap exactly corresponding to the filament diameter or a slit is provided on engaging surface of the teeth.

To improve the rubber penetration and to decrease the variation in the elongation during use, preferably the metal filaments 6 are twisted into a 1×n structure (n is the number of all the filaments in a cord).

In this case, it is preferable that the zigzags of the shaped filaments are not coherent and the zigzags show a homogeneous distribution in the longitudinal direction of the cord.

Figure 4:
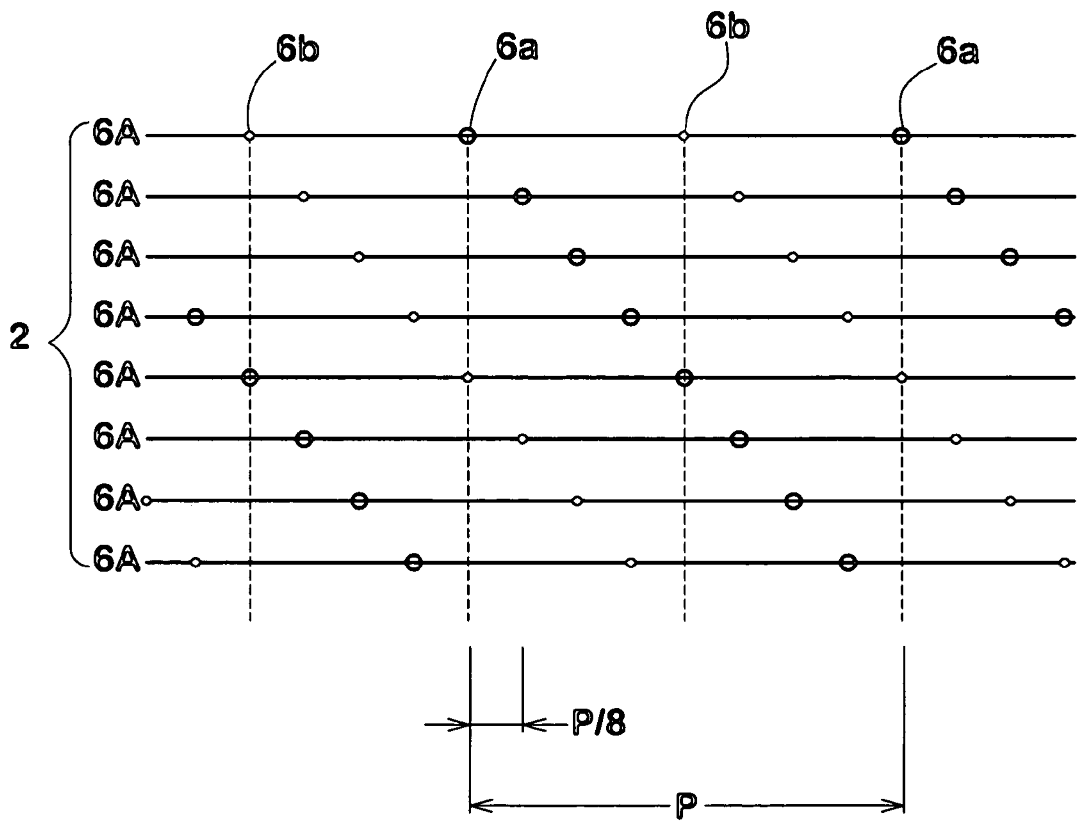
FIG. 4 is a diagram for explaining a displacement of the filaments in a cord.

To achieve these features, during twisting, a constant tension is given to each filament so that all the filaments are subjected to the identical constant tension. And in connection with the positions of the peaks 6*a* and troughs 6*b*, the filaments are shifted from each other in the longitudinal direction so that the peaks 6*a* of the filaments are displaced from one another, and also the troughs 6*b* of the filaments are displaced from one another. An example of the filaments' shift is shown in FIG. 4, wherein eight shaped filaments which are twisted together into a 1×8 structure are shifted by P/8 (wave length P/number n of filaments).

From this point of view, a constant waveform is desirable. As a result, the twist structure becomes stable along the length of the cord, and the variation of the initial elongation E becomes very small.

Further, as explained above, the initial elongation E is limited in a specific range of not more than 0.20%, therefore, the variation in the cord growth occurring in the tire during use can be decreased and tire durability can be remarkably improved.

The above-mentioned metal cord 2 is suitably used in a carcass ply of the heavy duty tires such as truck/bus tires. But, it is also possible to use the metal cord 2 in a tread reinforcing belt, bead reinforcing layer and the like of the heavy duty tire and also in a tread reinforcing belt, bead reinforcing layer and the like of the passenger car radial tires.

According to the present invention, a pneumatic tire 1 includes the metal cords 2 as a reinforcing cord ply or layer 5.

The pneumatic tire 1 comprises: a tread portion 11; a pair of axially spaced bead portions 13 each with a bead core 15 therein; a pair of sidewall portions 12 extending between the tread edges and the bead portions; a carcass 16 extending between the bead portions 13; a belt 17 disposed radially outside the carcass in the tread portion 11; and optionally a band 18 covering the radially outside of each axial edge of the belt 17, and a bead reinforcing layer 19 disposed in each of the bead portions 13.

The carcass 16 is composed of at least one ply of cords arranged radially at an angle in the range of from 70 to 90 degrees with respect to the tire equator CO, extending between the bead portions 13 through the tread portion 11 and sidewall portions 12 and turned up around the bead core 15 in each bead portion 13 from the axially inside to the axially outside of the tire to form a pair of turnup portions and a main portion therebetween.

The belt 17 comprises at least two cross plies of high modulus cords laid at an angle of from 10 to 35 degrees with respect to the tire equator CO.

The bead portions 13 are each provided with a bead apex 20 made of a hard rubber to reinforce the bead portion.

The band 18 is composed of a cord or cords wound on the radially outside of the belt at a small angle of at most about 5 degrees, for example almost zero degree with respect to the tire equator Co. organic fiber cords such as nylon are used as the band cord. In this example, axially-separated bands so called edge band are employed, but a full-width band covering the overall width of the belt 17 may be employed alone or in combination with the edge band.

The bead reinforcing layer 19 is composed of one ply of cords arranged at an angle crosswise to the carcass cords, and extends in a U-shape from the axially inside to the axially outside along the carcass 16.

Figure 5:
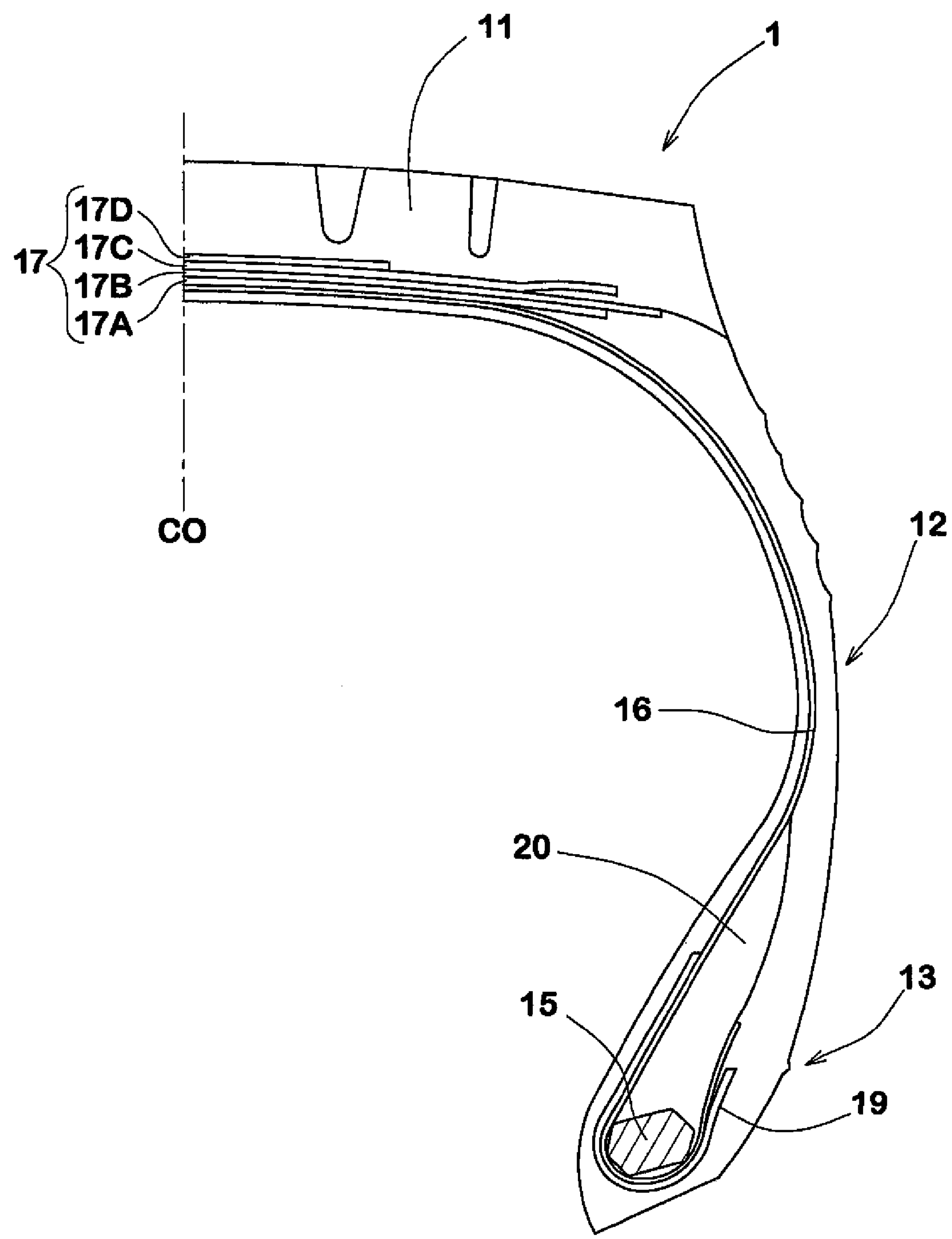
FIG. 5 is a cross sectional view of a heavy duty tire according to the present invention.

In FIG. 5, the pneumatic tire 1 according to the present invention is a heavy duty radial tire in which the above-mentioned metal cords 2 are used as the carcass cord. The carcass 16 is composed of a single ply of the metal cords 2 arranged radially at an angle of 90 degrees with respect to the tire equator CO. The belt 17 is composed of four plies 17A, 17B, 17C and 17D of steel cords which are different from the above-mentioned metal cord 2 and stronger than the carcass cords. More specifically, the filament diameter and the total number of the filaments are larger than the carcass cord, and a layered cord structure is employed. In this embodiment, the band 18 is not provided. The bead reinforcing layer 19 composed of one ply of the above-mentioned metal cords 2 is disposed.

Figure 6:
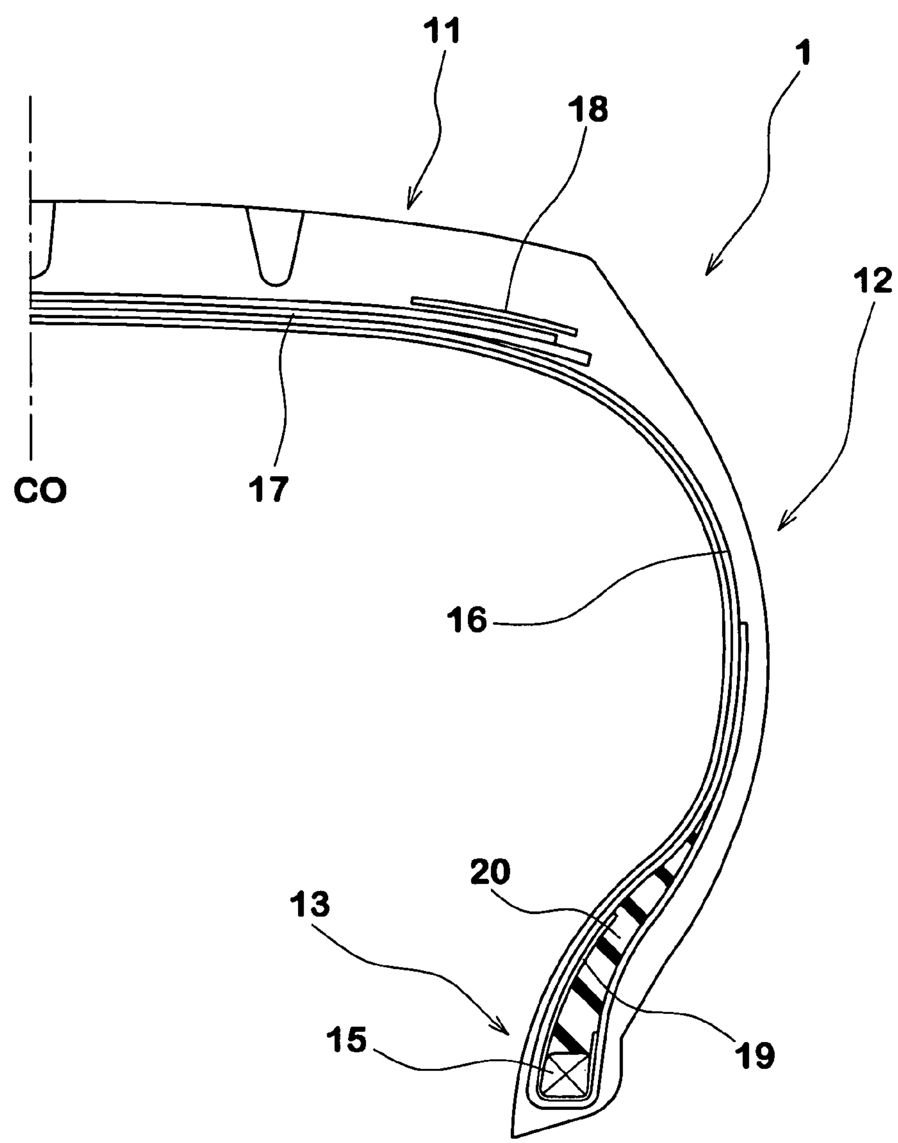
FIG. 6 is a cross sectional view of a passenger car tire according to the present invention.

In FIG. 6, the pneumatic tire 1 according to the present invention is a passenger car radial tire in which the above-mentioned metal cords 2 are used in the belt 17. In this case too, the carcass 16 is composed of a single ply of cords arranged radially at an angle of 90 degrees with respect to the tire equator CO. In this example, organic fiber cords are used as the carcass cord, but the above-mentioned metal cord 2 may be used too. The belt 17 consists of the two cross plies of the above-mentioned metal cords 2, and further the edge band 18 is provided. The bead apex 20 is disposed between the main portion and each turned up portion of the carcass ply 16, and the turned up portion extends radially outwardly into the middle of the sidewall portion 12 beyond the radially outer end of the bead apex 20, abutting the carcass ply main portion.

Figure 7:
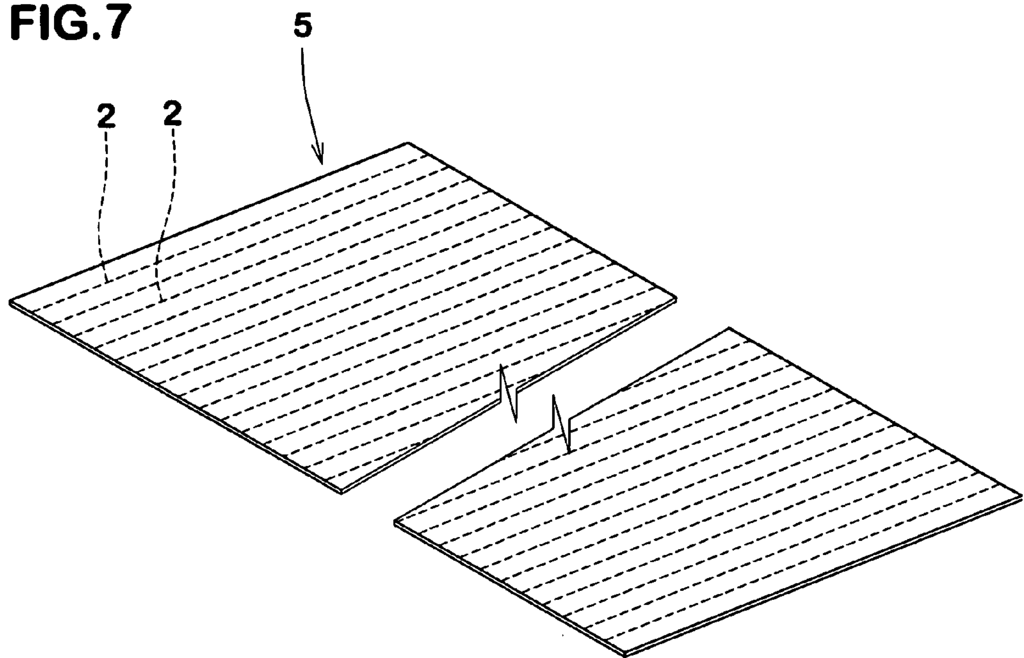
FIG. 7 is a schematic perspective view of a rubberized ply of parallel metal cords.
Figure 8:
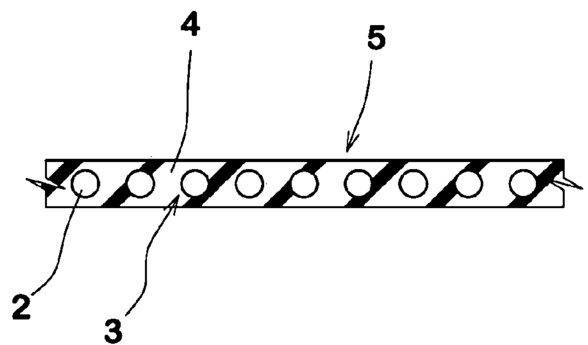
FIG. 8 is an enlarged schematic cross sectional view of the rubberized ply.

In manufacturing these tire, the carcass ply 16, belt ply 17 and bead reinforcing layer 19 are first formed as a parallel cord array rubberized with a topping rubber 4 as shown in FIGS. 7 and 8, and cut into a strip having a certain width, length and cord angle. The strip is wound around a tire building drum directly or indirectly.

In the case of the carcass ply, the raw strip is first wound in a cylindrical shape and then swollen into a troidal shape. Thus, the change of shape is very large when compared with other tire components. This means that the filaments' contacting condition is liable to be changed altering the cord characteristics.

In the present invention however, due to the above-described cord structure, the filaments' contact is stable and the variation becomes small.

In the finished tire, if the initial elongations E of the metal cords 2 in each component especially in the carcass ply have a standard deviation of more than 0.02, the cords become uneven with respect to the degree of the cord growth, and deformation is liable to concentrate on particular cords and the cords are fatigued to decrease the tire durability.

Thus, it is necessary to control the standard deviation within a range of not more than 0.02. Such a standard deviation can be easily achieved by using the metal cords 2.

Incidentally, the standard deviation is $$(\Sigma(Ei-Em)^2/n)^{1/2}$$

wherein

Em is the average of the initial elongations for the number (n) of cords, and

Ei is the initial elongation of each cord (i=1 to n).

The standard deviation refers to the initial elongation Ei of the metal cord 2 embedded in the tire 1. Thus, the metal cords 2 are first took out from the tire and then the initial elongation is obtained from the elongations E1 and E2 measured as explained above. To measure all of the embedded cords 2 is ideal but inefficient. In practice, therefore, a certain number of the cords are took out and measured. Twenty cord samples took out at regular intervals around the tire may be good enough, and it is preferable that the measuring position is in the middle of the cord length. For example, in the case of the carcass ply, the measuring position is set in the tread center region.

In cooperation with the above-described arrangements, as the initial elongations E of the metal cords 2 are limited within the range of not more than 0.20% as explained above, the standard deviation can be decreased to under 0.02.

In addition to this reason, the upper limit of 0.20% is also preferable for the following reason. If the initial elongation is more than 0.20%, the cord can elongate largely, If a large elongation is caused in the rubber, due to the contraction of the rubber, the cord is subjected to a compressive stress and an extraordinary deformation tends to occur. As a result, the cord fatigues and the tire durability decreases. As to the lower limit, if the initial elongation is less than 0.05%, the cord growth becomes too small, and as a result, the cords become liable to be subjected to a large tension and broken early.

Therefore, the initial elongation E is set in a range of not less than 0.05%, preferably not less than 0.10%, more preferably not less than 0.14%, but not more than 0.20%, preferably not more than 0.19%.

Comparison Tests

Truck/bus radial tires of size 11R22.5 having the structure shown in FIG. 5 were made and tested as follows. The test tires had the same structure except for the carcass. The carcass was composed of one ply of the above-mentioned metal cords (1×9×0.2 mm). The cord count was 40/5 cm (under the bead core). The initial elongation was changed as show in Table 1. The belt was composed of four plies of steel cords (3+8+13×0.23 mm HT). In each ply, the cord count was 24/5 cm. The cord angles of the four plies are +65, +20, −20, −20 degrees with respect to the tire circumferential direction (from inside to outside).

Standard Deviation Test:

From the carcass ply of the new tire, twenty metal cords were took out from twenty positions in the tread center region at regular intervals around the tire. Then, the initial elongation of each sample cord was measured and the average for twenty cords was computed and listed in Table 1.

Retained Strength Test:

After running for 200,000 kilometers, the tire was disassembled and the carcass cords were took out from the tire and the retained strength was measured to obtain the percentage of the retained strength to the original strength before running. The average value for ten cords took out from circumferential positions equally spaced around the tire.

Durability Test:

Using a tire testing drum, the running distance (maximum=5000 km) until the carcass cords in the sidewall portion were broken was measured under a tire load of 300% of the maximum load and a tire inflation pressure of 1000 kPa.

The test results are shown in Table 1.

Table 1

| Tire | Ref. 1 | Ref. 2 | Ex. 1 | Ex. 2 |
|---|---|---|---|---|
| Initial elongation (%) | 0.25 | 0.222 | 0.18 | 0.15 |
| Standard deviation | 0.11 | 0.045 | 0.01 | 0.01 |

Table 1-continued

| Tire | Ref. 1 | Ref. 2 | Ex. 1 | Ex. 2 |
|---|---|---|---|---|
| Test results | | | | |
| Retained strength (%) | 63 | 84 | 91 | 94 |
| Durability (kM) | 458<br>CBU | 1745<br>CBU | 5000<br>no damage | 5000<br>no damage |

CBU: cord damage

From the test results it was confirmed that by limiting the Initial elongation (%) in a specific range and the standard deviation under a specific value, the tire durability and the retained strength can be remarkably improved unexpectedly.

The preferable embodiments are described above, but some modifications are possible as far as the initial elongation maintains the constant value throughout the cord length. For example, the filaments 6 may include shaped filaments 6A having different waveforms with respect to the wave lengths P and/or half-wave lengths Q. Further, some of the straight segments 6*c* may be modified as being curved, for example the straight segments 6*c* are alternately curved. The metal cord 2 can be formed in a layered cord structure or rope twist structure.

The invention claimed is:

1. A pneumatic tire comprising:

a rubber component reinforced with metal cords each made of metal filaments twisted together, all said metal cords having the same initial elongation in a range of from 0.05 to 0.20%, wherein the initial elongation of each cord is the difference of an elongation in % of the cord at a load of 49N from an elongation in % of the cord at a load of 2.5N, all the metal filaments have the same diameter (d) in a range of 0.15 to 0.30 mm, all the metal filaments are shaped in the same two-dimensional zigzag waveform, the zigzag waveform has constant wave lengths (P) and constant wave heights (h), wherein the ratio (P/d) is in the range of 100/3 to 700/3, and the ratio (h/d) is in the range of 5/3 to 80/3, and in each metal cord all the metal filaments are shifted in the longitudinal direction of the cord so that the phases of the zigzag wave forms are evenly shifted, and so that the standard deviation of the initial elongation is in the range of not more than 0.02.

2. The pneumatic tire according to claim 1, wherein said rubber component is a carcass ply.

3. The pneumatic tire according to claim 1, wherein the number of metal filaments is in the range of from 8 to 12.

4. The pneumatic tire according to claim 1, wherein the initial elongation is in a range of from 0.10% to 0.19%.

5. The pneumatic tire according to claim 1, wherein the initial elongation is in a range of from 0.14% to 0.19%.

6. A method of manufacturing a metal cord having an initial elongation of from 0.05 to 0.20%, comprising:

shaping all metal filaments in the same two-dimensional zigzag waveform, and twisting the shaped metal filaments together, wherein the number of the filaments is in the range of from 8 to 12, all the metal filaments have the same diameter (d) of from 0.15 to 0.30 mm, the zigzag waveform of each said shaped metal filament has constant wave lengths (P) and constant wave heights (h) wherein the ratio (P/d) is in the range of 100/3 to 700/3, and the ratio (h/d) is in the range of 5/3 to 80/3, and in each metal cord all the metal filaments are shifted in the longitudinal direction of the cord so that the phases of the zigzag waveforms are evenly shifted, and so that a standard deviation of the initial elongation of the metal cords is not more than 0.02.

7. The method of manufacturing a metal cord according to claim 6, wherein the number of metal filaments is in the range of from 8 to 12.

8. The method of manufacturing a metal cord according to claim 6, wherein the initial elongation is in a range of from 0.10% to 0.19%.

9. The method of manufacturing a metal cord according to claim 6, wherein the initial elongation is in a range of from 0.14% to 0.19%.

* * * * *